April 20, 1954
H. C. SIMONS ET AL
2,675,588
REAR WINDOW DEFROSTER
Filed Nov. 10, 1950
7 Sheets-Sheet 1
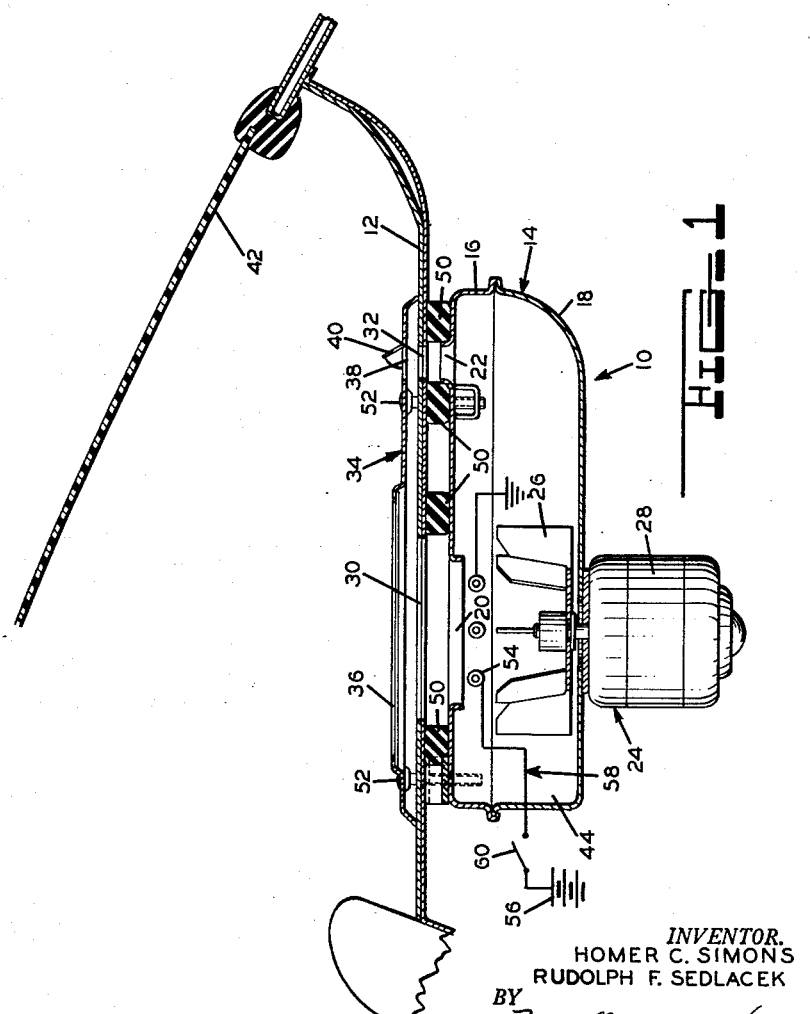
INVENTOR.
HOMER C. SIMONS
RUDOLPH F. SEDLACEK
BY
ATTORNEYS

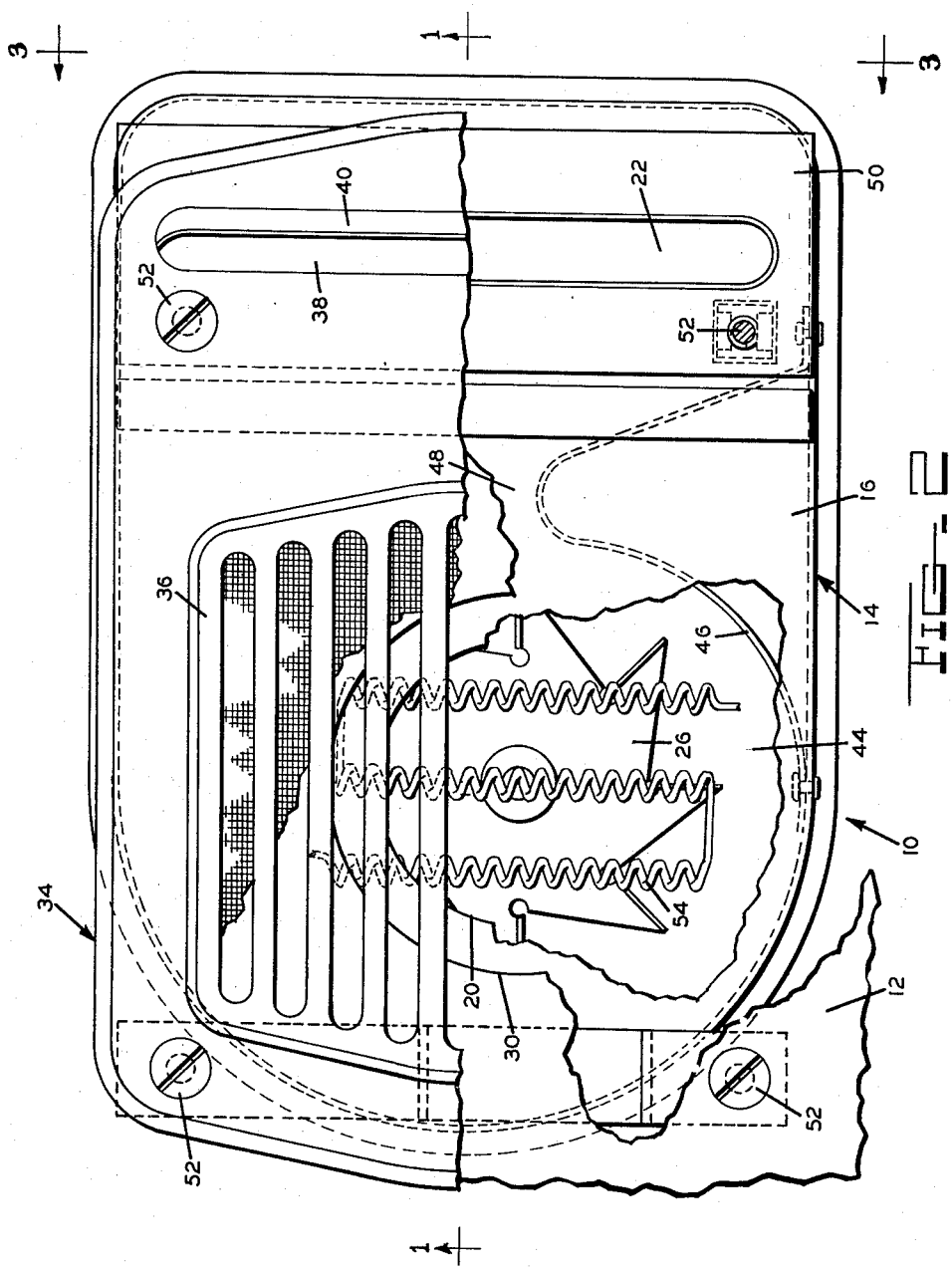

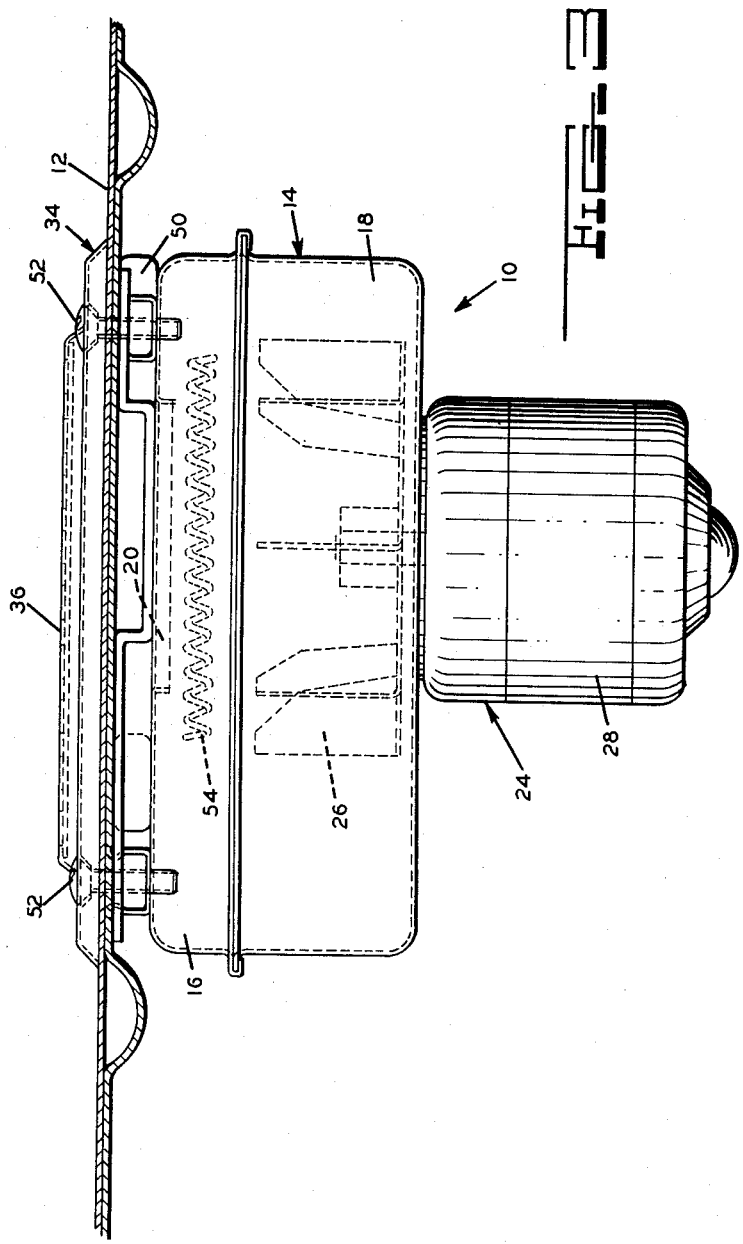

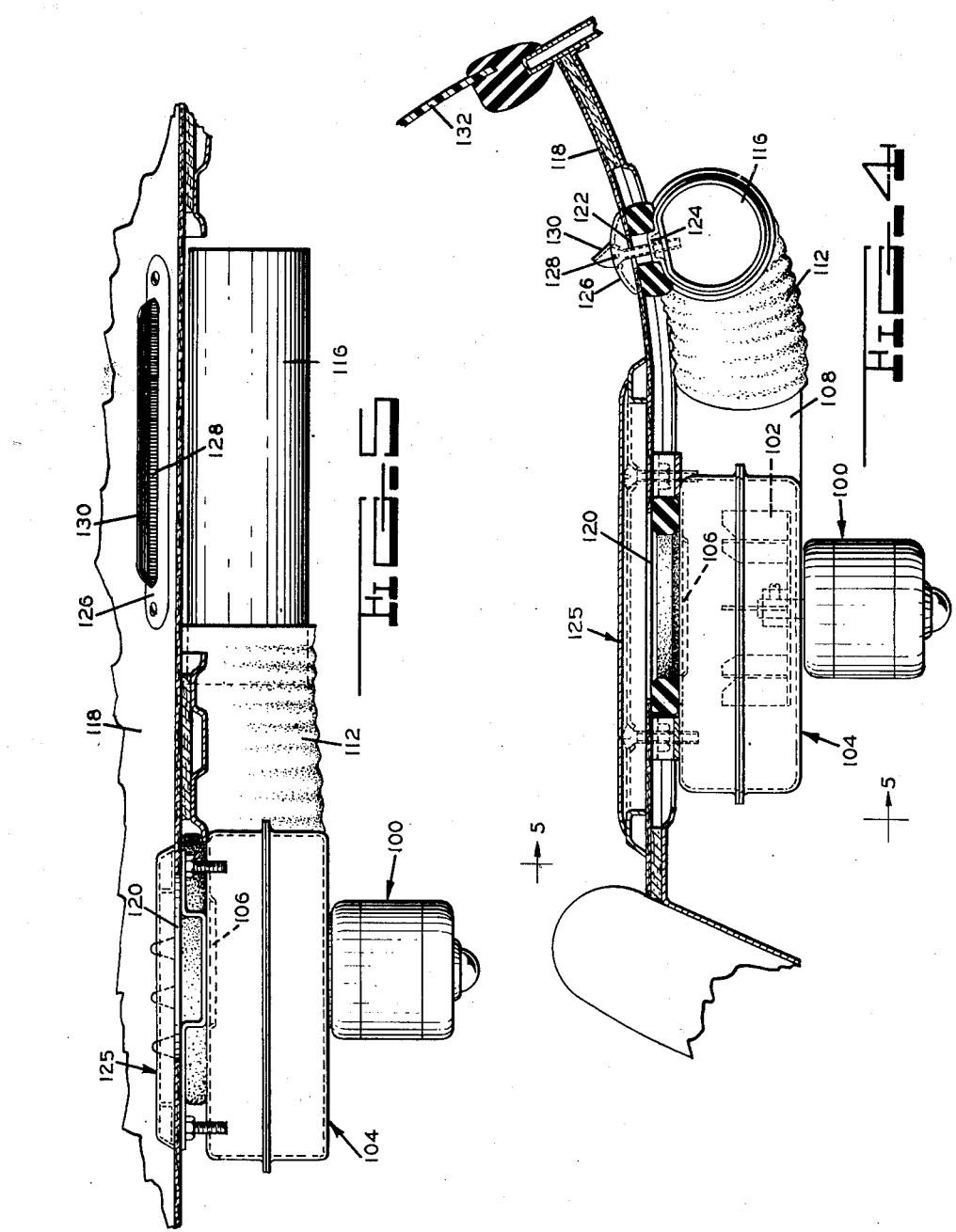

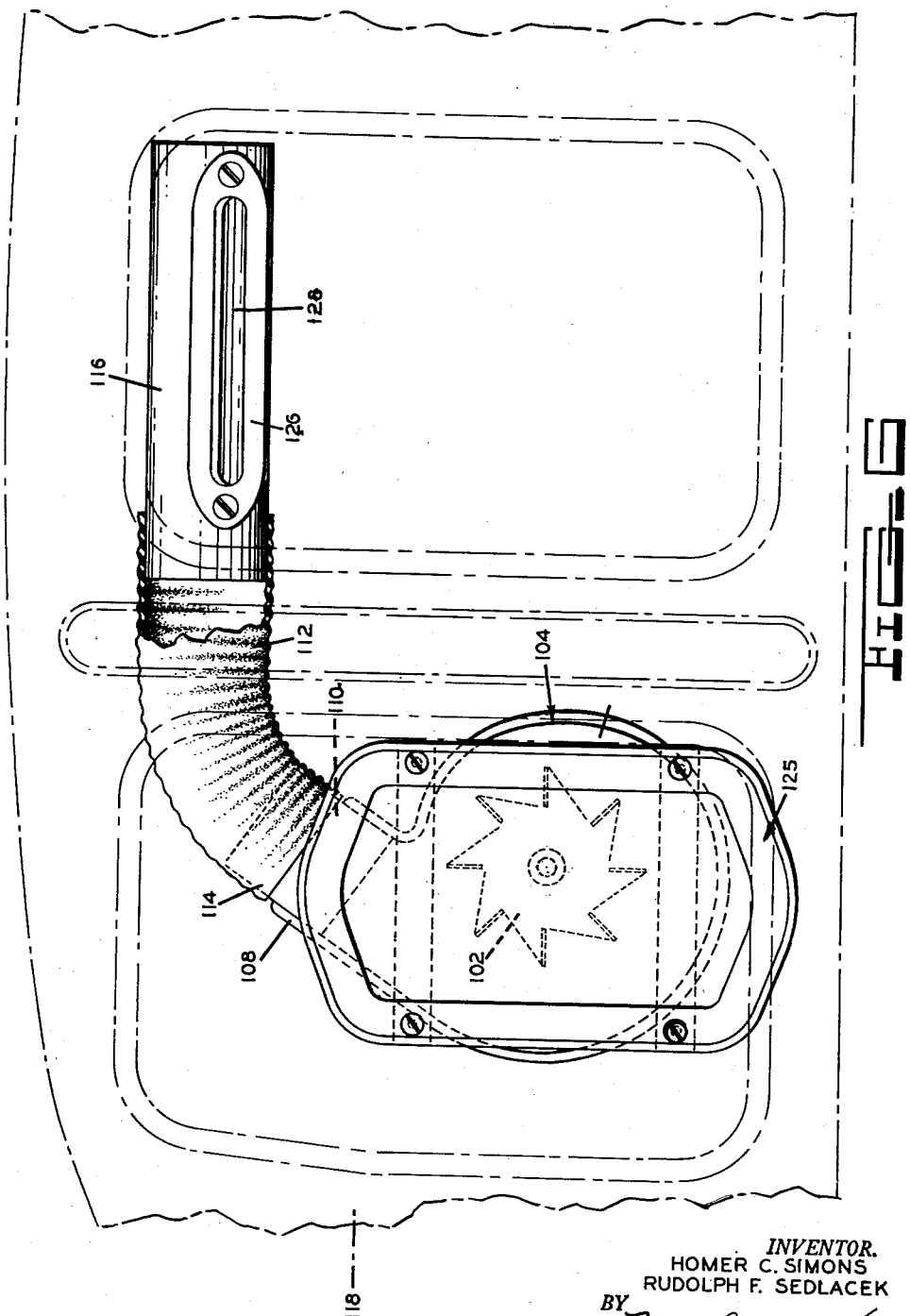

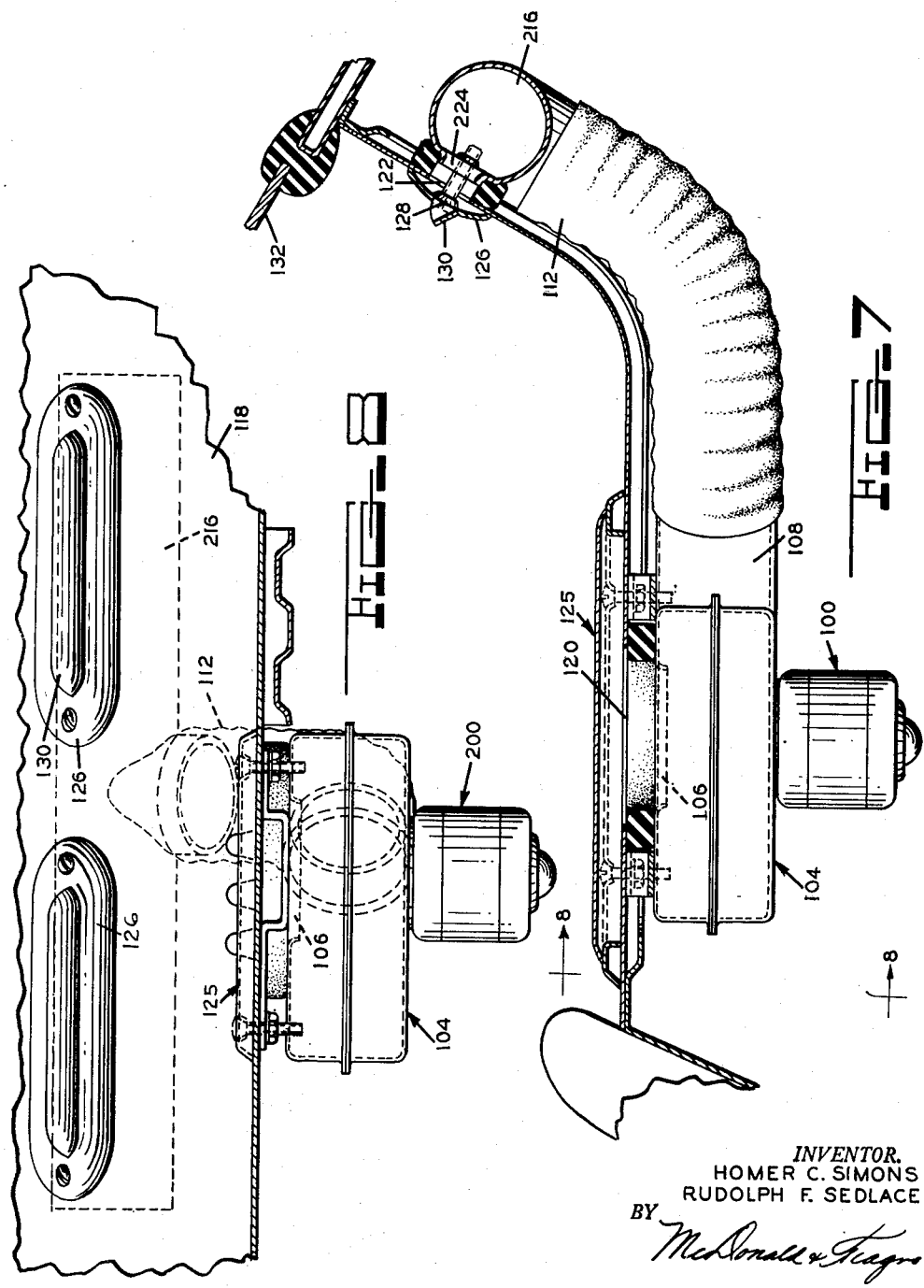

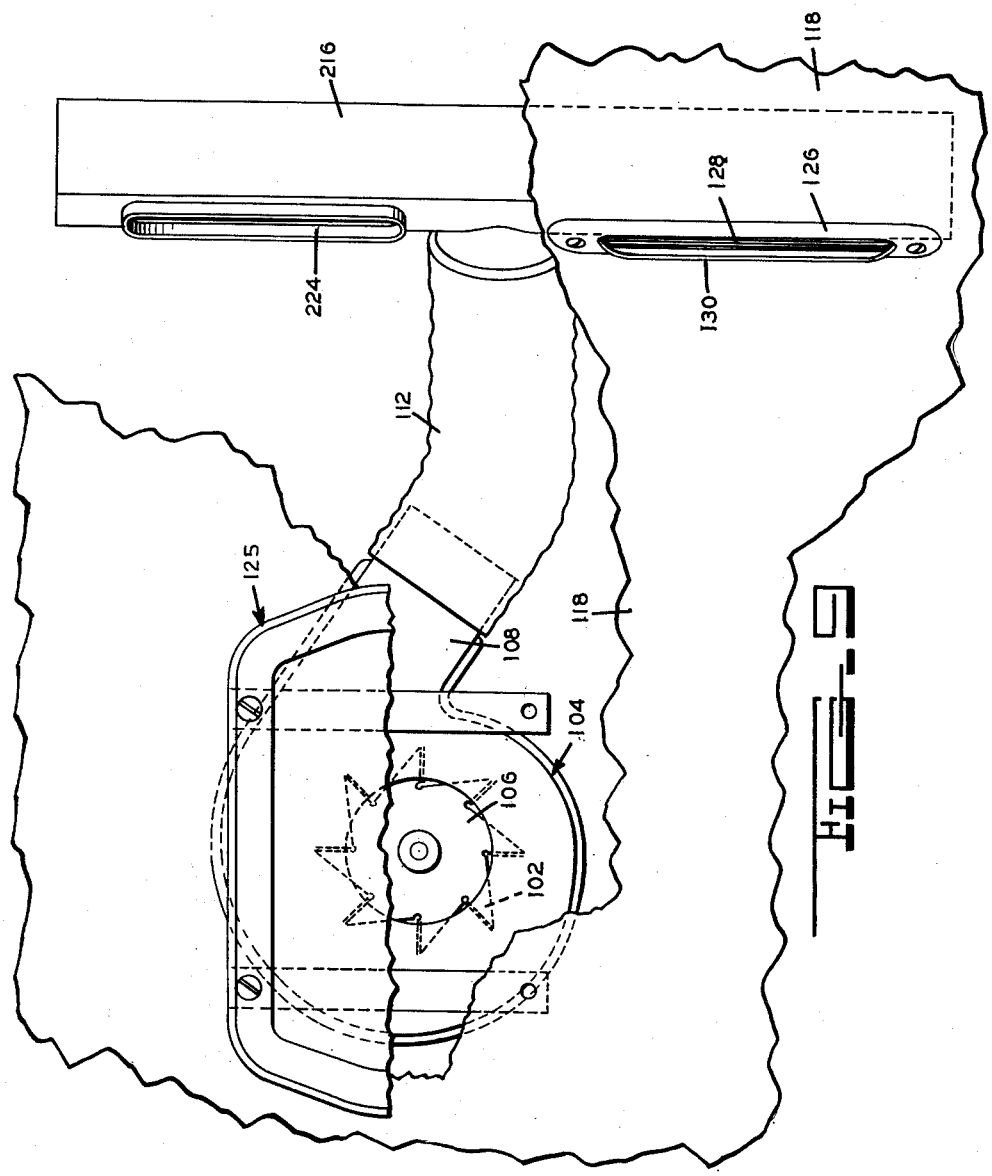

Patented Apr. 20, 1954

2,675,588

UNITED STATES PATENT OFFICE 2,675,588

REAR WINDOW DEFROSTER

Homer C. Simons, Maple Heights, and Rudolph F. Sedlacek, Cleveland, Ohio, assignors to Eaton Manufacturing Company, Cleveland, Ohio, a corporation of Ohio Application November 10, 1950, Serial No. 195,084

12 Claims. (Cl. 20—40.5)

This invention relates to automotive vehicle window defrosting, and prevention of condensation formation thereon and more particularly to air impelling and deflecting apparatus therefor.

Broadly the invention comprehends the provision of a recirculating air impelling and deflecting apparatus for distributing air in the passenger compartment of a vehicle across the inner surface of the rear window of the vehicle.

The invention has among its objects the provision of an air impelling and deflecting apparatus that is compact in structure, that can be conveniently mounted upon the rear deck of the passenger compartment of an automotive vehicle adjacent the rear window thereof, that includes a blower wheel and appropriate shrouding having air conducting means for receiving and conveying air to a desired area of the window to which the apparatus is applied and that is efficient and effective in dispelling condensation from the inner surface of the window and in defrosting the window when heated air is supplied thereto. The heated air can be obtained either from a separate vehicle heater medium or through the provision of a simple heater element in the apparatus itself.

Other objects and advantages of the invention will appear from the following description taken in connection with the drawings, forming a part of the specification; and in which:

Fig. 1 is a cross-sectional view of a combination air impelling and deflecting window defroster apparatus as applied to the rear deck of an automotive vehicle;

Fig. 2 is an enlarged partly sectionalized top elevation view of the apparatus of Fig. 1;

Fig. 3 is an end elevation view of Fig. 2 taken along lines 3—3 of Fig. 2;

Fig. 4 is a partly cross-sectionalized view of a modified form of defroster apparatus from that shown by Fig. 1 as applied to the rear deck of an automotive vehicle;

Fig. 5 is a partly cross-sectionalized view taken substantially along lines 5—5 of Fig. 4;

Fig. 6 is a top elevation view of Fig. 4;

Fig. 7 is a partly cross-sectionalized view of a further modified form of defroster apparatus from that shown by Fig. 1;

Fig. 8 is a partly cross-sectionalized view taken substantially along lines 8—8 of Fig. 7; and Fig. 9 is a partly broken away top plan view of Fig. 7.

Similar reference characters indicate corresponding parts throughout the several views of the drawings.

This invention is directed at the provision of a simple, economical and compact air impelling and deflecting apparatus for utilization primarily in the dispelling of condensation from the inner surface of the rear window of automotive vehicles. The apparatus herein devised is of such size and compactness as to be readily adaptable to most automotive vehicles wherein the apparatus consisting of an air blower and appropriate shrouding therefor having suitable air inlet and air deflecting means is mounted upon the rear deck in the passenger compartment to which applied adjacent the rear window, said apparatus for the most part being concealed under the deck. The apparatus in its disposition upon the rear deck is effective to cause an effective circulation of the air through the apparatus and distribution thereof directly over the window surface effective to maintain the window, moisture free. Under conditions wherein the passenger compartment is supplied heated air from a conventional type of heating unit, the apparatus will draw in and circulate the heated air over the window, thus maintaining the window free of moisture internally thereof and of snow, sleet and etc. externally thereof. Also it may be desirable that the apparatus have its own air heating element in which case a simple electric coil or the like be provided incorporated in the apparatus.

Referring to the drawings for more specific details of the invention, 10 represents generally a window defroster of unitary construction mounted upon the rear deck 12 in the passenger compartment of an automotive vehicle.

The defroster comprises a casing or shell 14 of two part construction 16 and 18, with part 16 providing a circular air inlet opening 20 and an oblong air outlet opening 22, the purpose of which will hereinafter appear, and part 18 supporting an air impelling apparatus 24, comprising a blower wheel 26 arranged internally of the shell and an electrical motor 28, for driving the blower, arranged externally of the shell. The shell 14 is supported on the underside of deck 12 outside of the passenger compartment by way of the part 16 being fixedly bolted to the deck and with the openings 20 and 22 having communication by way of complementary openings 30 and 32 in the deck with the passenger compartment.

A cover plate 34 is mounted on the passenger side of the deck opposite from the shell 14 and provides a grill portion 36 adapted to have direct air flow communication relation with the openings 20 and 30 of the shell and deck respectively and an opening 38 registering with the openings 22 and 32 of the shell and deck respectively. A deflector 40 is formed in plate 34 at the exit from the opening 38 for the purpose of directing the air exiting therefrom in the desired path for the proper defrosting of the rear window 42 of the vehicle lying adjacent the rear deck 12.

The blower wheel 26 is so mounted in the shell 14 as to have its axis lie in the center of opening 20 and 30 for the purpose of effectively drawing air from the passenger compartment by way of grill 36 and openings 20 and 30 for subsequent pressure build up in chamber 44 therefor formed in part 18 of shell 14 and discharged by way of openings 22, 32 and 38 to be deflected against the inner surface of window 42 and passage thereacross.

A shroud or peripheral scroll baffle plate 46 is provided in part 18 of shell 14 so as to permit of the build up of pressure by blower wheel 26 in chamber 44 to be discharged therefrom radially through opening 48 intermediate the space in shell 14 adjacent the openings 20 and 22 respectively.

The shell 14 in being supported upon the underside of deck 12 is spaced therefrom by a desired thickness of resilient material 50, acting to absorb shock transmitted thereto and is held in relation to the deck and cover plate by bolts 52 securing the plate and casing to one another upon the deck.

Through the compact arrangement of the air impelling apparatus and casing and the disposition of the air inlet and outlet openings an effective circulation of air is provided such that the window 42 can be maintained clear of any internal moisture and in the case of heated air being supplied to the passenger compartment will assist in removing snow, sleet and etc. from the external surface of window 42. Rather than depend on the supply of heated air from the passenger compartment especially where requirements dictate an electric heat coil 54, supplied electrical current from a battery 56 or other suitable source of power, may be suitably positioned in the defroster for supplying small amounts of heat ample in most instances to readily dispel moisture and snow, sleet and etc. from the window. In the case of defroster 10, the coil 54 is suitably mounted in the casing 14 intermediate the air inlet 20 and the blower wheel and is in electrical circuit 58 controlled as by an off and on switch 60 to permit of heated or unheated defroster operation as necessity dictates.

Fig. 4 through 6 illustrate a modified form of defroster from that shown by Fig. 1 through 3 in that the air impelling apparatus 100 has the blower wheel 102 thereof mounted for rotation in a two part scroll housing 104, said scroll housing having a circular air inlet opening 106 complementary to the central portion of the blower and co-axial thereto and a short radial duct 108 terminating in an outlet opening 110.

A flexible conduit 112 has one end 114 fastened upon duct 108 and its other end fitted into an air outlet manifold 116.

The scroll 104 together with the conduit and manifold are suitably mounted on the underside of the rear deck 118 of an automotive vehicle in the passenger compartment thereof and secured thereto in relation to appropriate openings 120 and 122 provided in the deck registering with the inlet opening 106 in the scroll housing and an air outlet opening 124 provided in manifold 116. A grill 125 is arranged on the passenger side of the deck over the opening 120 in the deck and a plate 126 having an opening 128 for registration with the openings 122 and 124 and a deflector 130 for deflecting the air exiting from opening 128 in the desired direction toward window 132.

The structure of Fig. 7 through 9 differs from that of Fig. 4 through 6 primarily in the fact that a manifold 216 is provided having a pair of outlet openings 224 instead of the singular air outlet opening manifold 116 of the structure of Fig. 4 through 6. The manifold 216 similarly to the manifold 116 has appropriate registration with openings through the rear deck and with openings in deflector plates therefor.

The structures of Fig. 4 through 9 can similarly to Fig. 1 through 3 be provided in a like manner for an identical purpose with an electric heat coil such as coil 54.

In all instances of the installation of structures Fig. 1 through 9, the air impelling apparatus and shrouding therefor effective to provide for the circulation of air in a more or less circuitous path from the outlet to the inlet air openings thereof and wherein the air in passing from the air outlet to the air inlet is moved across the window upon which defrosting is to be accomplished, the mechanism with the exception of the air inlet grill work and air outlet deflector therefor is disposed on the underside of the rear deck and can be readily adapted with regards to deck size and window position to afford efficient and effective defrosting of the window to which applied.

While this invention has been described in connection with certain specific embodiments, the principle involved is susceptible of numerous other applications that will readily occur to persons skilled in the art. The invention, therefore, is limited only as indicated by the scope of the appended claims.

What we claim is:

1. In an automotive vehicle having a passenger compartment, a rear deck adjacent the rear window of the vehicle, a window defrosting apparatus supported on the underside of the rear deck comprising an enclosure having an air inlet opening and an air outlet opening and air impelling means in the enclosure adjacent the air inlet opening, said rear deck having openings therethrough communicating with the passenger compartment, corresponding to the inlet and outlet openings of the enclosure and communicating therewith through which air passes in its course through the enclosure between the inlet and outlet openings thereof and for discharge impingement upon the inner surface of the rear window of the vehicle.

2. A claim according to claim 1 wherein a heating element is arranged in the enclosure in the path of air flow therethrough.

3. A claim according to claim 1 wherein the enclosure comprises a unitary casing.

4. A claim according to claim 1 wherein a grill is secured to the upperside of the rear deck over the inlet opening of the enclosure and the corresponding opening in the rear deck and a plate having a slot therein and an air deflector adjacent the slot is secured on the upperside of the rear deck with the slot registering with the outlet opening in the enclosure and the corresponding opening in the deck.

5. A claim according to claim 2 wherein a cover plate having a grill therein complementary to the inlet opening of the casing and an air deflecting slot complementary to the outlet opening is secured on the upperside of the rear deck.

6. A claim according to claim 1 wherein the enclosure comprises a scroll housing having the air inlet opening therein, and interconnected ducting and manifold with the ducting intermediate the discharge from the scroll housing and inlet to the manifold and with the manifold having the air outlet opening therein and wherein the air impelling means is in the form of a blower wheel rotatable in the scroll housing with its axis lying centrally of the air inlet opening in the scroll housing.

7. A claim according to claim 1 wherein the air outlet opening of the enclosure and corresponding opening on the rear deck are arranged in closer proximity to the bottom of the rear window than the air inlet opening of the enclosure and corresponding opening in the rear deck.

8. A claim according to claim 1 wherein an oblong slotted deflector means is secured on the upperside of the rear deck with the slot thereof complementary to the air outlet slot in the enclosure and the corresponding slot in the rear deck, the slot extending substantially in a parallel plane to the surface of the rear window.

9. In an automotive vehicle having a passenger compartment with a window, an apertured supporting panel disposed within said passenger compartment and adjacent the periphery of said window, and a window dehydrating device mounted on said panel, said device comprising an air circulating member mounted on and behind said panel and having an inlet port communicating with said passenger compartment through one of said panel apertures and an outlet port communicating with said passenger compartment through a second panel aperture, the latter aperture being disposed in juxtaposed relation with respect to the periphery of the window, an air deflecting element mounted on said panel and overlying said second panel aperture for directing circulation of the air across the interior surface of said window.

10. In an automotive vehicle having a passenger compartment with a rear window, an apertured supporting panel disposed transversely within said passenger compartment and adjacent the periphery of said rear window, and a rear window dehydrating device mounted on said panel, said device comprising an air circulating member mounted on and behind said panel and having an inlet port communicating with said passenger compartment through one of said panel apertures and an outlet port communicating with said passenger compartment through a second panel aperture, the latter aperture being disposed adjacent the periphery of said panel and in juxtaposed relation with respect to the periphery of said rear window, and an elongated air deflecting element mounted on said panel and overlying said second panel aperture for directing circulation of air across the interior surface of said rear window.

11. In an automotive vehicle having a passenger compartment with a rear window spaced behind the back of a passenger seat, an apertured supporting panel disposed within said passenger compartment and intermediate the back of said seat and said rear window and beneath said window, and a rear window dehydrating device mounted on said panel, said device comprising an air circulating member mounted on the underside of said panel and having an inlet port communicating with said passenger compartment through a centrally disposed panel aperture and an outlet port communicating with said passenger compartment through a second panel aperture, the latter aperture being formed about the periphery of said panel and in juxtaposed relation with respect to the periphery of the rear window, and an air deflecting element mounted in said panel and overlying said second panel aperture for directing circulation of air across the interior surface of said rear window.

12. In an automotive vehicle having a passenger compartment with a window, an apertured supporting panel disposed within said passenger compartment and adjacent the periphery of said window and a window dehydrating device mounted on said panel, said device comprising an air circulating member mounted on and behind said panel and having an inlet port communicating with said passenger compartment through one of said panel apertures and an outlet port communicating with said passenger compartment through a pair of panel apertures, the latter pair of apertures being disposed in spaced relation with respect to one another and in juxtaposed relation with respect to the periphery of said window, and air deflecting elements mounted on said panel and overlying said pair of panel apertures for directing circulation of air across the interior surface of said window.

References Cited in the file of this patent
UNITED STATES PATENTS

| Number | Name | Date |
| --- | --- | --- |
| 1,758,705 | Kean | May 13, 1930 |
| 1,995,769 | Feige | Mar. 26, 1935 |
| 2,045,826 | Benolken | June 30, 1936 |
| 2,150,110 | Strauss et al. | Mar. 7, 1939 |
| 2,152,338 | Will | Mar. 28, 1939 |
| 2,180,760 | Mayo | Nov. 21, 1939 |
| 2,492,506 | Stinnett | Dec. 27, 1949 |